W. HAWES.
Improvement in Oil-Cake Trimmers.
No. 132,962. Patented Nov. 12, 1872.
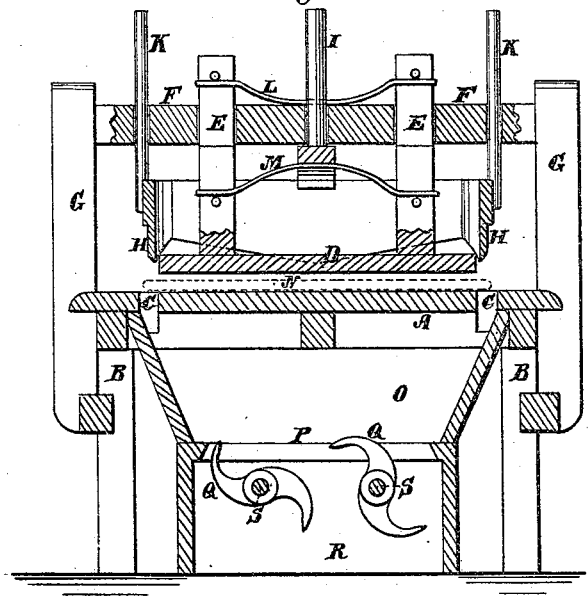
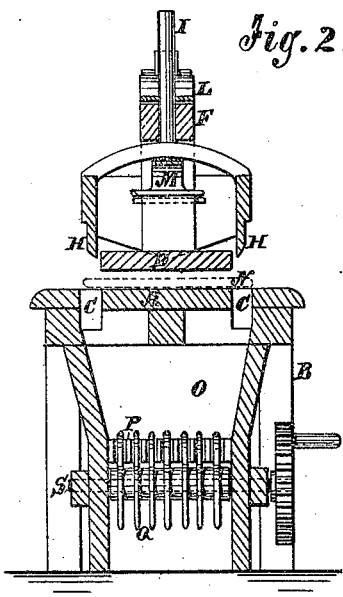
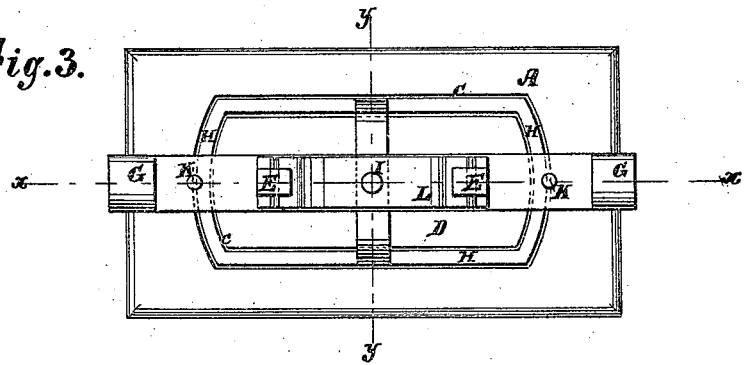
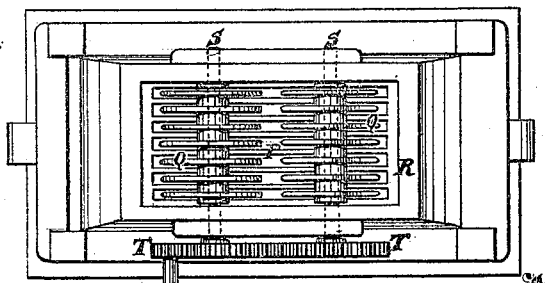
Witnesses:
A. Bennekendorf.
C. Sedgwick
Inventor:
W. Hawes
per
Attorneys.

UNITED STATES PATENT OFFICE.

WASHINGTON HAWES, OF PORT RICHMOND, NEW YORK.

IMPROVEMENT IN OIL-CAKE TRIMMERS.

Specification forming part of Letters Patent No. 132,962, dated November 12, 1872.

*To all whom it may concern:*

Be it known that I, WASHINGTON HAWES, of Port Richmond, in the county of Richmond and State of New York, have invented a new and Improved Oil-Cake Trimmer, of which the following is a specification:

My invention consists of an endless cutter and a press-clamp with a table for holding the oil-cake and suitable apparatus for working the cutter and clamp, arranged in such manner that one or more cakes placed on the table under the clamp may be trimmed completely all around the edges at one operation of the cutter. My invention also consists of a receiver for the trimmings and breaking apparatus combined with the trimmer, and adapted to break and pulverize them for being worked over again.

Figure 1 is a sectional elevation of my improved trimmer and the breaking apparatus taken on the line $x\ x$ of Fig. 3. Fig. 2 is a cross-section of Fig. 3 on the line $y\ y$. Fig. 3 is a plan view. Fig. 4 is a plan of the bottom of the machine.

Similar letters of reference indicate corresponding parts.

A represents the table on a suitable frame, B, with an endless slot, C, through it vertically, of the form and size of the trimmed oil-cake. D is a press-clamp of the same size and form arranged over the part of the table contained within the slot, and suspended by bars or rods P capable of sliding up and down in a cross-beam, F, supported on frame G or any other suitable means above the table-legs. H is an endless four-sided cutter constructed in the form of the outline of the cake, and suspended above the table so that the edges coincide with the edges of the clamp and the part of the table contained within the slot by a rod, I, to which a lever or any other suitable device or devices for working the cutter will be connected. K represents guide-rods connected to the cutter, and extending up through the beam F for guiding it in its ascending and descending movements. L is a spring arranged with the rods E of the press-clamp and the beam F for raising the clamp. M is another spring arranged with said rods and the cutter-actuating rod I, in such manner that at the beginning of the down movement of the cutter the press-clamp will be forced down a little in advance of the cutter, so as to clamp the cakes M on the table and hold them in position for being trimmed properly, said cakes being placed on the table under the cutter, as represented in the dotted lines, to be trimmed.

The cutter and the press-clamp are then raised and the trimmed cakes removed preparatory to the next operation, and so on. The trimmings drop through the slot C into a large receiver which is capable of receiving the long pieces of which they consist upon the grate P, through which the rotating hooks Q work from below to break and pulverize them preparatory to being worked over again. From the grates the pulverized materials are discharged through a passage, R, to any suitable receiver or to an elevator to be conveyed to the grinding apparatus. These hooks are mounted on horizontal shafts arranged under the grates, with gearing T for operating them by any suitable means. Each side of the cutter is pointed at the middle, so that it is graduated to a kind of shearing action, by which the labor is distributed and not performed simultaneously throughout, as it would be if the cutting-edge was straight and in the same plane, and thereby considerably lessened.

The object of trimming these cakes in this manner is to remove the portion around the edge which is swelled out from under the follower of the press used for pressing the meal to express the oil and form it into cakes, which is not thoroughly pressed, and retains a small quantity of oil, so that it can be reworked; also to trim the cakes preparatory for market. The said cakes are in slabs of the form of the table contained within the slot C, but a little larger when they come from the press in which they are formed, as indicated by the dotted lines N.

Heretofore these edges have been trimmed off by a plane, the cake being presented to the plane and moved against the cutter one side at a time, or the plane presented to the cake, which required considerable handling as well as time, and only one cake could be trimmed at once.

By this machine two or more cakes can be trimmed at once and by one operation. If more than one is trimmed at once they are piled one upon another.

The apparatus for working the cutter and the press-clamp may be contrived for working them by foot or other power, as may be preferred. It is not essential that the press-clamp be forced down by the cutter-actuating rod, as is here shown, for it may be worked independently by any preferred means. Neither is it essential that the trimmings be delivered directly into the pulverizer; but I consider it preferable to do so.

Having thus described my invention, I claim as new and desire to secure by Letters Patent—

1. The combination of a reciprocating cutter, H, press-clamp D, and the table A, substantially as described.

2. The combination, with an oil-cake trimmer composed essentially of a cutter, H, and slotted table A, of a pulverizing apparatus arranged beneath said table and consisting of hooks Q working between grate-bars, as specified.

3. The combination of the revolving hooks, receiver O, and grate P, substantially as specified.

WASHINGTON HAWES.

Witnesses:
  T. B. MOSHER,
  ALEX. F. ROBERTS.